United States Patent
Liu et al.

(10) Patent No.: US 11,083,992 B2
(45) Date of Patent: Aug. 10, 2021

(54) METHODS OF MAKING HIGH SELECTIVITY FACILITATED TRANSPORT MEMBRANES, HIGH SELECTIVITY FACILITATED TRANSPORT MEMBRANE ELEMENTS AND MODULES

(71) Applicant: UOP LLC, Des Plaines, IL (US)

(72) Inventors: Chunqing Liu, Arlington Heights, IL (US); Nicole K. Karns, Des Plaines, IL (US); Howie Q. Tran, Skokie, IL (US); Carl W. Liskey, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 259 days.

(21) Appl. No.: 16/380,540

(22) Filed: Apr. 10, 2019

(65) Prior Publication Data

US 2020/0101416 A1 Apr. 2, 2020

Related U.S. Application Data

(60) Provisional application No. 62/737,727, filed on Sep. 27, 2018.

(51) Int. Cl.
*B01D 53/22* (2006.01)
*B01D 71/22* (2006.01)
*B01D 69/14* (2006.01)

(52) U.S. Cl.
CPC ......... *B01D 53/228* (2013.01); *B01D 69/142* (2013.01); *B01D 71/22* (2013.01); *B01D 2257/702* (2013.01)

(58) Field of Classification Search
None
See application file for complete search history.

(56) References Cited

U.S. PATENT DOCUMENTS

| | | | |
|---|---|---|---|
| 5,670,051 A * | 9/1997 | Pinnau | B01D 53/228 210/500.27 |
| 7,361,800 B2 | 4/2008 | Herrera et al. | |
| 2004/0215045 A1* | 10/2004 | Herrera | B01D 69/142 585/818 |
| 2015/0025293 A1 | 1/2015 | Feiring et al. | |
| 2016/0256827 A1* | 9/2016 | Van Der Pluijm | B01D 53/22 |
| 2017/0354918 A1 | 12/2017 | Liu et al. | |
| 2018/0001268 A1 | 1/2018 | Liu et al. | |

FOREIGN PATENT DOCUMENTS

JP 2018138123 A 9/2018

OTHER PUBLICATIONS

International Search Report and Written Opinion for PCT/US2019052636, corresponding application, dated Dec. 19, 2019.

* cited by examiner

*Primary Examiner* — Jason M Greene
(74) *Attorney, Agent, or Firm* — Paschall & Associates, LLC; James C. Paschall

(57) ABSTRACT

A process is provided of making facilitated transport membrane comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores. In addition, the process provides a new method of making facilitated transport membrane spiral wound elements or hollow fiber modules for olefin/paraffin separations, particularly for C3=/C3 and C2=/C2 separations.

20 Claims, No Drawings

METHODS OF MAKING HIGH SELECTIVITY FACILITATED TRANSPORT MEMBRANES, HIGH SELECTIVITY FACILITATED TRANSPORT MEMBRANE ELEMENTS AND MODULES

This application claims priority from provisional patent application Ser. No. 62/737,727 filed Sep. 27, 2018, which is incorporated herein in its entirety.

BACKGROUND OF THE INVENTION

Over 170 Separex™ membrane systems have been installed in the world for gas separation applications such as for the removal of acid gases from natural gas, in enhanced oil recovery, and hydrogen purification. Honeywell UOP Separex™ spiral wound membrane systems currently hold the membrane market leadership for natural gas upgrading to remove carbon dioxide and hydrogen sulfide from natural gas. These membranes, however, do not have outstanding performance for olefin/paraffin separations. Development of new stable and very high selectivity membranes is critical for the future success of membranes for olefin/paraffin separation applications such as propylene/propane and ethylene/ethane separations.

Light olefins, such as propylene and ethylene, are produced as co-products from a variety of feedstocks in a number of different processes in the chemical, petrochemical, and petroleum refining industries. Various petrochemical streams contain olefins and other saturated hydrocarbons. Typically, these streams are from stream cracking units (ethylene production), catalytic cracking units (motor gasoline production), or the dehydrogenation of paraffins.

Currently, the separation of olefin and paraffin components is performed by cryogenic distillation, which is expensive and energy intensive due to the low relative volatilities of the components. Large capital expense and energy costs have created incentives for extensive research in this area of separations, and low energy-intensive membrane separations have been considered as an attractive alternative.

In principle, membrane-based technologies have the advantages of both low capital cost and high-energy efficiency compared to conventional separation methods for olefin/paraffin separations, such as propylene/propane and ethylene/ethane separations. Four main types of membranes have been reported for olefin/paraffin separations. These are facilitated transport membranes, polymer membranes, mixed matrix membranes, and inorganic membranes. Facilitated transport membranes, or ion exchange membranes, which sometimes use silver ions as a complexing agent, have very high olefin/paraffin separation selectivity. However, poor chemical stability, due to carrier poisoning or loss, high cost, and low flux, currently limit practical applications of facilitated transport membranes.

Separation of olefins from paraffins via conventional polymer membranes has not been commercially successful due to inadequate selectivities and permeabilities of the polymer membrane materials, as well as due to plasticization issues. Polymers that are more permeable are generally less selective than are less permeable polymers. A general trade-off has existed between permeability and selectivity (the so-called "polymer upper bound limit") for all kinds of separations, including olefin/paraffin separations. In recent years, substantial research effort has been directed to overcoming the limits imposed by this upper bound. Various polymers and techniques have been used, but without much success in terms of improving the membrane selectivity.

More efforts have been undertaken to develop metal ion incorporated, high olefin/paraffin selectivity facilitated transport membranes. The high selectivity for olefin/paraffin separations is achieved by the incorporation of metal ions such as silver (I) or copper (I) cations into the solid nonporous polymer matrix layer on top of the highly porous membrane support layer (so-called "fixed site carrier facilitated transport membrane") or directly into the pores of the highly porous support membrane (so-called "supported liquid facilitated transport membrane") that results in the formation of a reversible metal cation complex with the pi bond of olefins, whereas no interaction occurs between the metal cations and the paraffins. Addition of water, plasticizer, or humidification of the olefin/paraffin feed streams to either the fixed site carrier facilitated transport membranes or the supported liquid facilitated transport membranes is usually required to obtain reasonable olefin permeances and high olefin/paraffin selectivities. The performance of fixed site carrier facilitated transport membranes is much more stable than that of the supported liquid facilitated transport membranes and the fixed site carrier facilitated transport membranes are less sensitive to the loss of metal cation carriers than the supported liquid facilitated transport membranes.

Pinnau et al. disclosed a solid polymer electrolyte fixed site carrier facilitated transport membrane comprising silver tetrafluoroborate incorporated poly(ethylene oxide), see U.S. Pat. No. 5,670,051. Herrera et al. disclosed a process for the separation of olefin/paraffin mixtures using a silver cation-chelated chitosan fixed site carrier facilitated transport membrane, see U.S. Pat. No. 7,361,800. Herrera et al. disclosed the preparation of a composite facilitate transport membrane by coating an aqueous chitosan solution in 2% acetic acid on a microporous support membrane, converting water soluble chitosan polymer coating layer containing ammonium groups to water insoluble chitosan polymer coating layer containing free amino groups via sodium hydroxide (NaOH) treatment using a NaOH solution in a mixture of ethanol and water, and finally immersing the membrane in a silver nitrate aqueous solution, wherein the support membrane is made from polyesters, polyamides, polyimides, polyvinylidene fluoride, polyacrylonitrile, polysulfones or polycarbonates.

Feiring et al. disclosed a new facilitated transport membrane comprising silver (I) cation exchanged fluorinated copolymer synthesized from a perfluorinated cyclic or cyclizable monomer and a strong acid highly fluorinated vinylether compound, see US 2015/0025293.

The composite facilitated transport membranes disclosed in the literature comprise an ultrafiltration or microfiltration membrane as the support membrane. The use of a relatively hydrophilic, nanoporous polymeric membrane such as polyethersulfone membrane as the support membrane for the preparation of fixed site carrier facilitated transport membranes for olefin/paraffin separations has not been reported in the literature. In particular, the use of a relatively hydrophilic, very small pore, nanoporous support membranes with an average pore diameter of less than 10 nm on the membrane skin layer surface for the preparation of fixed site carrier facilitated transport membranes has not been disclosed in the literature. In addition, the fabrication of facilitated transport membrane spiral wound elements or hollow fiber membrane modules have not been reported in the literature.

US 2017/0354918 A1 by Liu et al. disclosed a facilitated transport membrane comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores, a method of making this membrane, and the use of this membrane for olefin/paraffin separations, particularly for propylene/propane (C3=/C3) and ethylene/ethane (C2=/C2) separations. The facilitated transport membrane fabrication process disclosed by US 2017/0354918 A1 includes a step of treating the chitosan-coated membrane with a basic NaOH solution and washing with water to form a thin, nonporous, water insoluble chitosan layer on the surface of the support membrane. US 2017/0354918 A1 by Liu et al. also disclosed that the facilitated transport membrane can have either spiral wound or hollow fiber geometry. However, this US patent application did not disclose the fabrication method for the preparation of facilitated transport membrane spiral wound elements of hollow fiber modules.

Development of new stable, high permeance, and high selectivity facilitated transport membranes and fabrication of their spiral wound elements or hollow fiber modules with simplified procedures is still required for the use of membranes for olefin/paraffin separations such as propylene/propane and ethylene/ethane separations.

SUMMARY OF THE INVENTION

This invention provides a new method of making facilitated transport membrane comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores, a new method of making spiral wound elements or hollow fiber modules from such facilitated transport membrane for olefin/paraffin separations, particularly for C3=/C3 and C2=/C2 separations.

The present invention discloses a new method of making the facilitated transport membranes with either flat sheet or hollow fiber geometry and comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores. The method comprises: a) coating a thin, nonporous, hydrophilic, water soluble chitosan polymer layer comprising ammonium groups on the skin layer surface of a relatively hydrophilic, very small pore, nanoporous, flat sheet or hollow fiber support membrane comprising hydrophilic polymers inside the very small nanopores on the skin layer surface using a 0.5-10 wt % chitosan solution in a 1-5 wt % dilute acetic acid aqueous solvent via any coating method such as dip-coating or meniscus coating method; b) immersing the thin, nonporous, hydrophilic, water soluble chitosan polymer layer comprising ammonium groups coated on the skin layer surface of the relatively hydrophilic, very small pore, nanoporous support membrane comprising hydrophilic polymers inside the very small nanopores on the skin layer surface in an aqueous solution of a metal salt such as silver nitrate ($AgNO_3$) with a concentration in a range of 0.2M to 10M for a certain time in a range from 5 min to 24 h to convert the thin, nonporous, hydrophilic, water soluble chitosan polymer layer comprising ammonium groups to a thin, nonporous, hydrophilic, water insoluble chitosan polymer layer and simultaneously convert the chitosan-coated flat sheet or hollow fiber support membrane to a facilitated transport flat sheet or hollow fiber membrane comprising a relatively hydrophilic, very small pore, nanoporous support membrane, a hydrophilic polymer inside the very small nanopores on the skin layer surface of the support membrane, a thin, nonporous, hydrophilic, water insoluble chitosan polymer layer coated on the surface of the flat sheet or hollow fiber support membrane, and metal salts incorporated in the chitosan polymer layer coated on the surface of the support membrane and the hydrophilic polymer inside the very small nanopores; and c) removing the extra aqueous metal salt solution from the facilitated transport flat sheet or hollow fiber membrane. In some cases, an additional coating step is applied between step a) and step b) by coating a second thin, nonporous, hydrophilic, water soluble chitosan polymer layer comprising ammonium groups on the first layer of the thin, nonporous, hydrophilic, water soluble chitosan polymer on the skin layer surface of a relatively hydrophilic, very small pore, nanoporous flat sheet or hollow fiber support membrane comprising hydrophilic polymers inside the very small nanopores on the skin layer surface using a 0.5-10 wt % chitosan solution in a 1-5 wt % dilute acetic acid aqueous solvent via any coating method such as dip-coating or meniscus coating method. The chitosan concentration in the chitosan solution in the dilute acetic acid aqueous solvent for the formation of the second thin, nonporous, hydrophilic, water soluble chitosan polymer layer can be the same as or lower than that in the chitosan solution in the dilute acetic acid aqueous solvent for the formation of the first thin, nonporous, hydrophilic, water soluble chitosan polymer layer. The addition of the second layer of the thin, nonporous, hydrophilic, water soluble chitosan polymer can plug the potential minor defects or pin-holes and also increase the thickness of the nonporous, hydrophilic, water soluble chitosan polymer coating layer when necessary.

The new method of making the facilitated transport membranes with either flat sheet or hollow fiber geometry and comprising a relatively hydrophilic, very small pore, nanoporous support membrane, a hydrophilic polymer inside the very small nanopores on the skin layer surface of the flat sheet or hollow fiber support membrane, a thin, nonporous, hydrophilic, water insoluble chitosan polymer layer coated on the surface of the support membrane, and metal salts incorporated in the water insoluble chitosan polymer layer coated on the surface of the support membrane and the hydrophilic polymer inside the very small nanopores disclosed in the present invention is a simplified and low cost membrane fabrication process, which avoids the use of the basic NaOH solution and water wash to form a thin, nonporous, water insoluble chitosan layer on the surface of the support membrane. The present invention discloses the use of an aqueous solution of a metal salt such as $AgNO_3$ aqueous solution to convert the thin, nonporous, hydrophilic, water soluble chitosan polymer layer comprising ammonium groups to the thin, nonporous, hydrophilic, water insoluble chitosan polymer layer and simultaneously to form metal salt-based facilitated transport membrane.

The present invention also discloses a new, simple method of making facilitated transport membrane spiral wound elements or hollow fiber modules comprising a facilitated transport flat sheet or hollow fiber membrane comprising a relatively hydrophilic, very small pore, nanoporous flat sheet or hollow fiber support membrane, a hydrophilic polymer inside the very small nanopores on the skin layer surface of the support membrane, a thin, nonporous, hydrophilic, water insoluble chitosan polymer layer coated on the surface of the support membrane, and metal salts incorporated in the hydrophilic, water insoluble chitosan polymer layer coated on the surface of the support membrane and the hydrophilic polymer inside the very small nanopores. The method comprises: a) winding a chitosan-coated spiral wound support membrane element using the thin, nonporous, hydrophilic, water soluble chitosan polymer-coated flat sheet support membrane, feed spacers, permeate spacers, gas impermeable sheets marketed as Mylar® sheets, a permeate tube, and gas impermeable glue, or fabricating a chitosan polymer-coated hollow fiber support membrane module using the thin, nonporous, hydrophilic, water soluble chitosan polymer-coated hollow fiber support membrane, a permeate tube which is optional, and gas impermeable glue, wherein the thin, nonporous, hydrophilic, water soluble chitosan polymer-coated flat sheet or hollow fiber support membrane comprises a single layer or dual layer of the thin, nonporous, hydrophilic, water soluble chitosan polymer comprising ammonium groups on the skin layer surface of a relatively hydrophilic, very small pore, nanoporous support membrane comprising hydrophilic polymers inside the very small nanopores on the skin layer surface; b) impregnating the chitosan polymer-coated spiral wound support membrane element or hollow fiber support membrane module with an aqueous solution of a metal salt such as silver nitrate (AgNO3) with a concentration in a range of 0.2M to 10M by exposing the thin, nonporous, hydrophilic, water soluble chitosan polymer layer comprising ammonium groups to the aqueous metal salt solution via a static solution soaking method, a pump-driven continuous solution circulation method, or a combination of the two for a certain time in a range from 5 min to 24 h to convert the thin, nonporous, hydrophilic, water soluble chitosan polymer layer comprising ammonium groups to a thin, nonporous, hydrophilic, water insoluble chitosan polymer layer and simultaneously convert the chitosan polymer-coated spiral wound support membrane element or hollow fiber support membrane module to a facilitated transport spiral wound membrane element or hollow fiber membrane module; and c) removing the extra aqueous metal salt solution from the facilitated transport spiral wound membrane element or hollow fiber membrane module after impregnating. The new method of making the facilitated transport spiral wound membrane element or hollow fiber membrane module disclosed in the present invention is a simplified, low cost membrane element or module fabrication process, which avoids the use of the basic NaOH solution and water wash to form a thin, nonporous, water insoluble chitosan layer on the surface of the support membrane between step a) and step b). The present invention discloses the use of an aqueous solution of a metal salt such as AgNO3 aqueous solution to impregnate the chitosan polymer-coated spiral wound support membrane element or hollow fiber support membrane module to convert the thin, nonporous, hydrophilic, water soluble chitosan polymer layer comprising ammonium groups to the thin, nonporous, hydrophilic, water insoluble chitosan polymer layer and simultaneously to form metal salt-based facilitated transport spiral wound membrane element or hollow fiber membrane module.

The present invention provides a process to treat a gaseous feed stream comprising from 99 to 1 mole % of one or more C2-C8 olefins and from 1 to 99 mole % of one or more C1-C8 paraffins, the process comprising passing the humidified gaseous feed stream to a feed side of the facilitated transport membrane spiral wound elements or hollow fiber modules comprising a relatively hydrophilic, very small pore, nanoporous support membrane, a hydrophilic polymer inside the very small nanopores on the skin layer surface of the support membrane, a thin, nonporous, hydrophilic, water insoluble chitosan polymer layer coated on the surface of the support membrane, and metal salts incorporated in the hydrophilic, water insoluble chitosan polymer layer coated on the surface of the support membrane and the hydrophilic polymer inside the very small nanopores, so that not less than 80 mole % of the olefins in the feed stream pass through the facilitated transport membrane spiral wound elements or hollow fiber modules and recovering a permeate stream comprising not less than 90 mole % of olefin and not more than 10 mole % of paraffin.

DETAILED DESCRIPTION OF THE INVENTION

Membrane technology has been of great interest for the separation of olefin/paraffin mixtures. However, despite significant research effort on olefin/paraffin separations by membrane technology, no commercial olefin/paraffin separation application using membranes has been reported so far.

This invention provides a new method of making facilitated transport membrane comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores, a new method of making spiral wound elements or hollow fiber modules from such facilitated transport membrane for olefin/paraffin separations, particularly for propylene/propane (C3=/C3) and ethylene/ethane (C2=/C2) separations.

The present invention discloses a new method of making the facilitated transport membranes with either flat sheet or hollow fiber geometry and comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores. The method comprises: a) coating a thin, nonporous, hydrophilic, water soluble chitosan polymer layer comprising ammonium groups on the skin layer surface of a relatively hydrophilic, very small pore, nanoporous, flat sheet or hollow fiber support membrane comprising hydrophilic polymers inside the very small nanopores on the skin layer surface using a 0.5-10 wt % chitosan solution in a 1-5 wt % dilute acetic acid aqueous solvent via any coating method such as dip-coating or meniscus coating method; b) immersing the thin, nonporous, hydrophilic, water soluble chitosan polymer layer comprising ammonium groups coated on the skin layer surface of the relatively hydrophilic, very small pore, nanoporous support membrane comprising hydrophilic polymers inside the very small nanopores on the skin layer surface in an aqueous solution of a metal salt such as silver nitrate ($AgNO_3$) with a concentration in a range of 0.2M to 10M for a certain time in a range from 5 min to 24 h to convert the thin, nonporous, hydrophilic, water soluble chitosan polymer layer comprising ammonium groups to a thin, nonporous, hydrophilic, water insoluble chitosan polymer layer and simultaneously convert the chitosan-coated flat sheet or hollow fiber support membrane to a facilitated transport flat sheet or hollow fiber membrane comprising a relatively hydrophilic, very small pore, nanoporous support membrane, a hydrophilic polymer inside the very small nanopores on the skin layer surface of the support membrane, a thin, nonporous, hydrophilic, water insoluble chitosan polymer layer coated on the surface of the flat sheet or hollow fiber support membrane, and metal salts incorporated in the chitosan polymer layer coated on the surface of the support membrane and the hydrophilic polymer inside the very small nanopores; and c) removing the extra aqueous metal salt solution from the facilitated transport flat sheet or hollow fiber membrane. In some cases, an additional coating step is applied between step a) and step b) by coating a second thin, nonporous, hydrophilic, water soluble chitosan polymer layer comprising ammonium groups on the first layer of the thin, nonporous, hydrophilic, water soluble chitosan polymer on the skin layer surface of a relatively hydrophilic, very small pore, nanoporous flat sheet or hollow fiber support membrane comprising hydrophilic polymers inside the very small nanopores on the skin layer surface using a 0.5-10 wt % chitosan solution in a 1-5 wt % dilute acetic acid aqueous solvent via any coating method such as dip-coating or meniscus coating method. The chitosan concentration in the chitosan solution in the dilute acetic acid aqueous solvent for the formation of the second thin, nonporous, hydrophilic, water soluble chitosan polymer layer can be the same as or lower than that in the chitosan solution in the dilute acetic acid aqueous solvent for the formation of the first thin, nonporous, hydrophilic, water soluble chitosan polymer layer. The addition of the second layer of the thin, nonporous, hydrophilic, water soluble chitosan polymer can plug the potential minor defects or pin-holes and also increase the thickness of the nonporous, hydrophilic, water soluble chitosan polymer coating layer when necessary.

The relatively hydrophilic, very small pore, nanoporous support membrane used for the preparation of the facilitated transport membrane using the new simplified method disclosed in the present invention comprises a relatively hydrophilic polymer selected from a group consisting of, but is not limited to, polyethersulfone (PES), a blend of PES and polyimide, cellulose acetate, cellulose triacetate, and a blend of cellulose acetate and cellulose triacetate. The relatively hydrophilic polymer described in the present invention is a water-insoluble polymer comprising ether groups or hydroxyl groups. The relatively hydrophilic, very small pore, nanoporous support membrane described in the current invention has an average pore diameter of less than 10 nm on the membrane skin layer surface. The relatively hydrophilic, very small pore, nanoporous support membrane described in the current invention can be either asymmetric integrally skinned membrane or thin film composite (TFC) membrane with either flat sheet (spiral wound) or hollow fiber geometry.

The relatively hydrophilic, very small pore, nanoporous support membrane used for the preparation of the facilitated transport membrane using the new simplified method disclosed in the present invention has an average pore diameter of less than 10 nm on the membrane skin layer surface. The use of the relatively hydrophilic polymer such as PES, for the preparation of the very small pore, nanoporous support membrane in the present invention improves the interaction between the support membrane and the hydrophilic polymer inside the very small nanopores on the surface of the relatively hydrophilic, very small pore, nanoporous support membrane. The use of the relatively hydrophilic polymer such as PES for the preparation of the very small pore, nanoporous support membrane in the present invention also improves the adhesion between the relatively hydrophilic, very small pore, nanoporous support membrane and the thin, nonporous, hydrophilic, water soluble polymer layer coated on the support membrane. To prepare the relatively hydrophilic, very small pore, nanoporous flat sheet or hollow fiber support membrane, a membrane casting or spinning dope comprising a relatively hydrophilic polymer such as PES, a solvent such as a mixture of N-methyl-2-pyrrolidone (NMP) and 1,3-dioxolane, a non-solvents such as an alcohol or a hydrocarbon, and an additive such as glycerol is used in the present invention. The addition of a hydrocarbon non-solvent such as n-hexane, n-heptane, n-decane or n-octane and a pore forming agent such as glycerol to the membrane casting or spinning dope formula is the key for the formation of very small nanopores with an average pore diameter of less than 10 nm on the membrane skin layer surface of the relatively hydrophilic, very small pore, nanoporous support membrane.

The use of the very small pore, nanoporous support membrane comprising hydrophilic polymers inside the very small nanopores on the membrane surface for the preparation of the facilitated transport membrane using the new simplified method disclosed in the present invention prevents the easy diffusion and transportation of the metal salt carriers from the hydrophilic polymer layer coated on the surface of the support membrane and the hydrophilic polymer inside the very small nanopores to the large pores underneath the very small nanopores of the support membrane, which will result in the loss of the metal salt carriers from the facilitated transport membrane under pressure. The dried, relatively hydrophilic, very small pore, nanoporous support membrane comprising hydrophilic polymers inside the very small nanopores on the membrane surface used in the present invention has carbon dioxide permeance of 800-10,000 GPU and no carbon dioxide/methane selectivity at 50° C. under 30-100 psig 10% $CO_2$/90% CH4 mixed gas feed pressure.

The hydrophilic polymer inside the very small nanopores on the skin layer surface of the relatively hydrophilic, very small pore, nanoporous support membrane of the facilitated transport membrane described in the current invention can be selected from, but is not limited to, a group of hydrophilic polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof.

The thin, nonporous, hydrophilic, water soluble polymer layer coated on the surface of the relatively hydrophilic, very small pore, nanoporous support membrane comprising hydrophilic polymers inside the very small nanopores on the skin layer surface of the support membrane described in the current invention comprises a hydrophilic polymer selected from, but is not limited to, a group of hydrophilic polymers containing chitosan, sodium carboxylmethyl-chitosan, carboxylmethyl-chitosan, and mixtures thereof. Preferably, the chitosan-based hydrophilic polymer in the thin, nonporous, hydrophilic, water soluble polymer layer coated on the surface of the relatively hydrophilic, very small pore, nanoporous support membrane described in the current invention and the hydrophilic polymer inside the very small nanopores on the surface of the support membrane described in the current invention are selected from different hydrophilic polymers. As an example, the hydrophilic polymer in the thin, nonporous, hydrophilic polymer layer coated on the surface of the relatively hydrophilic, very small pore, nanoporous support membrane comprising hydrophilic polymers inside the very small nanopores on the skin layer surface of the support membrane described in the current invention is chitosan and the hydrophilic polymer inside the very small nanopores on the skin layer surface of the relatively hydrophilic, very small pore, nanoporous support membrane described in the current invention is sodium alginate or sodium hyaluronate.

The metal salts incorporated in the thin, nonporous, hydrophilic, water insoluble polymer layer coated on the surface of the support membrane and incorporated in the hydrophilic polymer inside the very small nanopores on the skin layer surface of the support membrane described in the current invention are preferred to be selected from silver salts or copper salts, such as silver(I) nitrate or copper(I) chloride.

The single or dual layer of the thin, nonporous, hydrophilic, water insoluble polymer coated on the skin layer surface of the support membrane used in the present invention not only eliminates the defects on the facilitated transport membrane, but also stabilizes the metal salts incorporated in the hydrophilic, water insoluble polymer layer coated on the skin layer surface of the support membrane. The present invention teaches a new method of converting the thin, nonporous, hydrophilic, water soluble polymer layer comprising ammonium groups coated on the surface of the support membrane to the thin, nonporous, hydrophilic, water insoluble polymer layer directly by using an aqueous solution of a metal salt such as $AgNO_3$ aqueous solution, wherein the aqueous solution of the metal salt is also used to convert the thin, nonporous, hydrophilic, water insoluble polymer-coated support membrane to facilitated transport membrane.

The new method of making the facilitated transport membranes with either flat sheet or hollow fiber geometry and comprising a relatively hydrophilic, very small pore, nanoporous support membrane, a hydrophilic polymer inside the very small nanopores on the skin layer surface of the flat sheet or hollow fiber support membrane, a thin, nonporous, hydrophilic, water insoluble polymer layer such as a chitosan layer coated on the surface of the support membrane, and metal salts incorporated in said water insoluble polymer layer coated on the surface of the support membrane and the hydrophilic polymer inside the very small nanopores disclosed in the present invention is a simplified and low cost membrane fabrication process, which avoids the use of the basic NaOH solution and water wash to form a thin, nonporous, water insoluble polymer layer on the surface of the support membrane.

Different from the facilitated transport membrane fabrication processes disclosed in the literature including a step of treating the water soluble polymer such as chitosan-coated membrane with a basic NaOH solution and washing with water to form a thin, nonporous, water insoluble polymer layer on the surface of the support membrane, the present invention discloses the use of the aqueous solution of the metal salt such as AgNO3 aqueous solution to directly convert the thin, nonporous, hydrophilic, water soluble polymer layer comprising ammonium groups to the thin, nonporous, hydrophilic, water insoluble polymer layer and simultaneously to form metal salt-based facilitated transport membrane.

The metal cations such as silver cations on the metal salts incorporated in the hydrophilic, water insoluble polymer layer coated on the surface of the support membrane and the hydrophilic polymer inside the very small nanopores on the skin layer surface of the support membrane of the facilitated transport membrane prepared using the new fabrication method described in the current invention form reversible metal cation complexes with the pi bonds of olefins, whereas no interactions occur between the metal cations and the paraffins in the facilitated transport membrane described in the present invention. Therefore, the facilitated transport membranes comprising a relatively hydrophilic, very small pore, nanoporous support membrane, a hydrophilic polymer inside the very small nanopores on the skin layer surface of the support membrane, a thin, nonporous, hydrophilic, water insoluble polymer layer coated on the surface of the support membrane, and metal salts incorporated in the hydrophilic, water insoluble polymer layer coated on the surface of the support membrane and the hydrophilic polymer inside the very small nanopores described in the present invention can provide both high selectivity and high permeance for olefin/paraffin separations.

The facilitated transport flat sheet or hollow fiber membranes comprising a relatively hydrophilic, very small pore, nanoporous support membrane, a hydrophilic polymer inside the very small nanopores on the skin layer surface of the support membrane, a thin, nonporous, hydrophilic, water insoluble polymer layer coated on the surface of the support membrane, and metal salts incorporated in the hydrophilic, water insoluble polymer layer coated on the surface of the support membrane and the hydrophilic polymer inside the very small nanopores prepared using the new fabrication method described in the present invention can be used for olefin/paraffin separation performance evaluation, but cannot be used directly to be assembled in a separator in spiral wound or hollow fiber configuration. Therefore, the present invention also discloses a new, simple method of making facilitated transport membrane spiral wound elements or hollow fiber modules comprising a facilitated transport flat sheet or hollow fiber membrane comprising a relatively hydrophilic, very small pore, nanoporous flat sheet or hollow fiber support membrane, a hydrophilic polymer inside the very small nanopores on the skin layer surface of the support membrane, a thin, nonporous, hydrophilic, water insoluble chitosan polymer layer coated on the surface of the support membrane, and metal salts incorporated in the hydrophilic, water insoluble chitosan polymer layer coated on the surface of the support membrane and the hydrophilic polymer inside the very small nanopores. The method comprises:

a) winding a chitosan-coated spiral wound support membrane element using the thin, nonporous, hydrophilic, water soluble chitosan polymer-coated flat sheet support membrane, feed spacers, permeate spacers, gas impermeable sheets marketed as Mylar® sheets, a permeate tube, and gas impermeable glue, or fabricating a chitosan polymer-coated hollow fiber support membrane module using the thin, nonporous, hydrophilic, water soluble chitosan polymer-coated hollow fiber support membrane, a permeate tube which is optional, and gas impermeable glue, wherein the thin, nonporous, hydrophilic, water soluble chitosan polymer-coated flat sheet or hollow fiber support membrane comprises a single layer or dual layer of the thin, nonporous, hydrophilic, water soluble chitosan polymer comprising ammonium groups on the skin layer surface of a relatively hydrophilic, very small pore, nanoporous support membrane comprising hydrophilic polymers inside the very small nanopores on the skin layer surface. The use of appropriate gas impermeable glue, feed spacers, permeate spacers, and sheets marketed as Mylar® sheets is critical to the formation of a leak-free chitosan-coated spiral wound support membrane element; b) impregnating the chitosan polymer-coated spiral wound support membrane element or hollow fiber support membrane module with an aqueous solution of a metal salt such as silver nitrate (AgNO3) with a concentration in a range of 0.2M to 10M by exposing the thin, nonporous, hydrophilic, water soluble chitosan polymer coating layer comprising ammonium groups to the aqueous metal salt solution via a static solution soaking method, a pump-driven continuous solution circulation method, or a combination of the two for a certain time in a range from 5 min to 24 h to convert the thin, nonporous, hydrophilic, water soluble chitosan polymer layer comprising ammonium groups to a thin, nonporous, hydrophilic, water insoluble chitosan polymer layer and simultaneously convert the chitosan polymer-coated spiral wound support membrane element or hollow fiber support membrane module to a facilitated transport spiral wound membrane element or hollow fiber membrane module; and c) removing the extra aqueous metal salt solution from the facilitated transport spiral wound membrane element or hollow fiber membrane module after impregnation. The new method of making the facilitated transport spiral wound membrane element or hollow fiber membrane module disclosed in the present invention is a simplified, low cost membrane element or module fabrication process, which avoids the use of the basic NaOH solution and water wash to form a thin, nonporous, water insoluble chitosan layer on the surface of the support membrane between step a) and step b). The present invention discloses the use of an aqueous solution of a metal salt such as AgNO3 aqueous solution to impregnate the chitosan polymer-coated spiral wound support membrane element or hollow fiber support membrane module to convert the thin, nonporous, hydrophilic, water soluble chitosan polymer layer comprising ammonium groups to the thin, nonporous, hydrophilic, water insoluble chitosan polymer layer and simultaneously to form metal salt-based facilitated transport spiral wound membrane element or hollow fiber membrane module.

The metal salt-based facilitated transport spiral wound membrane elements or hollow fiber membrane modules prepared using the new method described in the present invention may provide co-current, counter-current, or cross-current flows of the feed on the retentate and permeate sides of the membrane. In one exemplary embodiment, the facilitated transport membrane comprising a relatively hydrophilic, very small pore, nanoporous support membrane, a hydrophilic polymer inside the very small nanopores on the skin layer surface of the support membrane, a thin, nonporous, hydrophilic, water insoluble polymer layer coated on the surface of the support membrane, and metal salts incorporated in the hydrophilic, water insoluble polymer layer coated on the surface of the support membrane and the hydrophilic polymer inside the very small nanopores prepared using the new method described in the present invention is in a spiral wound module that is in the form of flat sheet having a thickness from about 30 to about 400 µm. In another exemplary embodiment, the facilitated transport membrane comprising a relatively hydrophilic, very small pore, nanoporous support membrane, a hydrophilic polymer inside the very small nanopores on the skin layer surface of the support membrane, a thin, nonporous, hydrophilic, water insoluble polymer layer coated on the surface of the support membrane, and metal salts incorporated in the hydrophilic, water insoluble polymer layer coated on the surface of the support membrane and the hydrophilic polymer inside the very small nanopores described in the present invention is in a hollow fiber module that is in the form of thousands, tens of thousands, hundreds of thousands, or more, of parallel, closely-packed hollow fibers or tubes. In one embodiment, each fiber has an outside diameter of from about 200 micrometers (µm) to about 700 millimeters (mm) and a wall thickness of from about 30 to about 200 µm. In operation, a humidified feed contacts a first surface of the facilitated transport membrane described in the present invention, a permeate permeates the facilitated transport membrane described in the present invention and is removed therefrom, and a retentate, not having permeated the facilitated transport membrane described in the present invention, also is removed therefrom.

Olefin/paraffin permeation experiments on the facilitated transport flat sheet membranes and spiral wound membrane elements prepared using the new method described in the current invention have demonstrated that they have super high olefin/paraffin selectivity, high olefin permeance, and high performance stability for olefin/paraffin separations.

The present invention provides a process for the separation of paraffin and olefin, such as, for example, in gaseous streams comprising from 99 to 1 mole % of one or more C2-C8 olefins and from 1 to 99 mole % of one or more C1-C8 paraffins produced from stream cracking, catalytic cracking, the dehydration of paraffins, and the like using the facilitated transport membrane spiral wound elements or hollow fiber modules prepared using the new method disclosed in the current invention comprising the facilitated transport membrane with a relatively hydrophilic, very small pore, nanoporous support membrane, a hydrophilic polymer inside the very small nanopores on the skin layer surface of the support membrane, a thin, nonporous, hydrophilic, water insoluble polymer layer coated on the surface of the support membrane, and metal salts incorporated in the hydrophilic, water insoluble polymer layer coated on the surface of the support membrane and the hydrophilic polymer inside the very small nanopores in the present invention, the process comprising passing humidified the gaseous feed stream to a feed side of the facilitated transport membrane spiral wound elements or hollow fiber modules, so that not less than 80 mole % of the olefins in the feed stream pass through the facilitated transport membrane and recovering a permeate stream comprising not less than 90 mole % of olefin and not more than 10 mole % of paraffin. The process utilizes the facilitated transport membrane spiral wound elements or hollow fiber modules prepared using the new method described in the present invention that is highly permeable but also highly selective to olefin, thus permitting olefin to permeate the membrane at a much higher rate than the paraffin. The gaseous feed stream must be humidified with water to maintain permeance and selectivity of the facilitated transport membrane. Variations in the relative humidity (RH) in the feed affect the performance of the facilitated transport membrane. It is preferred to maintain the relative humidity of the feed to the membrane within a range of about 30% to about 100% to allow proper hydration of the membrane while not causing water condensation on the membrane. Various embodiments of the process contemplated herein can be used to replace C2 and C3 splitters, as hybrid membrane/distillation units for olefin purification, for recovery of olefins from polypropylene vent streams or from fluid catalytic cracking (FCC) off-gas streams, or the like. The process can also be used for the production of polymer grade propylene, thus offering significant energy, capital, and operating cost savings compared to conventional distillation.

The olefin/paraffin separation process using the facilitated transport membrane spiral wound elements or hollow fiber modules prepared using the new method described in the present invention comprising the facilitated transport membrane with a relatively hydrophilic, very small pore, nanoporous support membrane, a hydrophilic polymer inside the very small nanopores on the skin layer surface of the support membrane, a thin, nonporous, hydrophilic, water insoluble polymer layer coated on the surface of the support membrane, and metal salts incorporated in the hydrophilic, water insoluble polymer layer coated on the surface of the support membrane and the hydrophilic polymer inside the very small nanopores starts by contacting a first surface of the membrane with an olefin/paraffin feed. The olefin may comprise, for example, propylene or ethylene and the paraffin may comprise propane or ethane, respectively. The olefin/paraffin feed comprises a first concentration of olefin and a first concentration of paraffin depending on the application for which the membrane separation is used. For example, a propane dehydrogenation process typically provides a feed containing about 35 mass percent propylene, whereas a feed from an FCC unit generally contains about 75 mass percent propylene. The flow rate and temperature of the olefin/paraffin feed have those values that are suitable for a desired application. Next, a permeate is caused to flow through the membrane and from a second surface of the membrane. Because the facilitated transport membrane comprising a relatively hydrophilic, very small pore, nanoporous support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores described in the present invention for olefin/paraffin separations is much more selective to the olefin than to the paraffin, the permeate has a concentration of olefin that is much higher than the concentration of the paraffin in the permeate. In one exemplary embodiment, the concentration of the olefin in the permeate is 99.5-99.9 mass percent. In addition, while some paraffin may permeate through the membrane, the permeate has a concentration of paraffin that is much less than the concentration of the paraffin in the feed. The permeate can then be removed from the second surface of the membrane. As the permeate passes through the membrane, a retentate or residue, which has not permeated the membrane, is removed from the first surface of the membrane. The retentate has a concentration of olefin that is much lower than the concentration of olefin in the feed and much lower than the concentration of the permeate. The retentate also has a concentration of paraffin that is higher than a concentration of paraffin that is in the feed.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLES

The following examples are provided to illustrate one or more preferred embodiments of the invention, but are not limited embodiments thereof. Numerous variations can be made to the following examples that lie within the scope of the invention.

Example 1

Preparation of AgNO$_3$/Chitosan Facilitated Transport Dense Film Membrane Using Direct AgNO$_3$ Aqueous Solution Conversion Method A AgNO$_3$/chitosan facilitated transport dense film membrane was prepared using a direct silver nitrate (AgNO$_3$) aqueous solution conversion method. 2.0 g of chitosan was added to 48.0 g of 2 wt % acetic acid aqueous solution and the mixture was stirred for 10 h at 50° C. to completely dissolve chitosan to form a homogeneous solution. The solution was then filtered and cast onto the surface of a clean glass plate. The acetic acid and water were evaporated at 60° C. for 24 h to form a water soluble chitosan dense film comprising ammonium groups. The water soluble chitosan dense film comprising ammonium groups was then directly converted to AgNO$_3$/chitosan facilitated transport dense film membrane comprising water insoluble chitosan polymer by soaking the water soluble chitosan dense film in a AgNO$_3$ aqueous solution (3M in H$_2$O) for 1 h.

Example 2

Preparation of Facilitated Transport Flat Sheet Membrane (FTM-AgNO$_3$-Single) Using Direct AgNO$_3$ Aqueous Solution Conversion Method A facilitated transport flat sheet membrane (FTM-AgNO$_3$-Single) with high propylene/propane selectivity was prepared from a relatively hydrophilic, very small pore, nanoporous polyethersulfone (PES) support membrane containing a hydrophilic sodium alginate polymer within the very small nanopores on the membrane skin layer surface and a thin, nonporous, hydrophilic, water soluble chitosan polymer coating on the membrane surface using a direct silver nitrate ($AgNO_3$) aqueous solution conversion method. A relatively hydrophilic, very small pore, nanoporous, asymmetric PES support membrane was prepared via the phase-inversion process. A membrane casting dope comprising PES (BASF), N-methyl pyrrolidone, 1,3-dioxolane, glycerol and n-decane was cast on a nylon fabric then gelled by immersion in a 1° C. water bath for about 10 min, and then annealed in a hot water bath at 85° C. for about 5 min. A dilute aqueous solution of sodium alginate was applied via a nipping method onto the surface of the wet, relatively hydrophilic, very small pore, nanoporous, asymmetric PES support membrane. The wet membrane comprising sodium alginate within the very small nanopores on the membrane skin layer surface was dried at 60-80° C. and then coated with a solution of chitosan dissolved in a dilute, aqueous acetic acid solution and then dried at 40-70° C. to form a thin, nonporous, hydrophilic, water soluble chitosan layer on the surface of the membrane. The thin, nonporous, hydrophilic, water soluble chitosan layer on the support membrane was then directly converted to thin, nonporous, hydrophilic, water insoluble chitosan layer and impregnated with $AgNO_3$ by soaking the membrane coating layer in a $AgNO_3$ aqueous solution (3M in $H_2O$) for 2-3 h. The extra $AgNO_3$ aqueous solution was then removed from the membrane surface and the membrane was tested with a humidified (relative humidity 60-100%) propylene/propane ($C_3=/C_3$) gas mixture (70% $C_3=$/30% $C_3$) at 791 kPa (100 psig) and 50° C. The performance of the facilitated transport membrane (abbreviated as FTM-$AgNO_3$-Single) is shown in TABLE 1.

Example 3

Preparation of Facilitated Transport Flat Sheet Membrane (FTM-$AgNO_3$-Dual) Using Direct $AgNO_3$ Aqueous Solution Conversion Method A facilitated transport flat sheet membrane (FTM-$AgNO_3$-Dual) with high propylene/propane selectivity was prepared from a relatively hydrophilic, very small pore, PES support membrane containing a hydrophilic sodium alginate polymer within the very small nanopores on the membrane skin layer surface and a thin, nonporous, hydrophilic, water soluble chitosan polymer coating on the membrane surface using a direct silver nitrate ($AgNO_3$) aqueous solution conversion method. A relatively hydrophilic, very small pore, nanoporous, asymmetric PES support membrane was prepared via the phase-inversion process. A membrane casting dope comprising PES (BASF), N-methyl pyrrolidone, 1,3-dioxolane, glycerol and n-decane was cast on a nylon fabric then gelled by immersion in a 1° C. water bath for about 10 min, and then annealed in a hot water bath at 85° C. for about 5 min. A dilute aqueous solution of sodium alginate was applied via a nipping method onto the surface of the wet, relatively hydrophilic, very small pore, nanoporous, asymmetric PES support membrane. The wet membrane comprising sodium alginate within the very small nanopores on the membrane skin layer surface was dried at 60-80° C. and then coated with a solution of chitosan dissolved in a dilute, aqueous acetic acid solution and then dried at 40-70° C. to form a thin, nonporous, hydrophilic, water soluble chitosan layer on the surface of the membrane. A second layer of thin, nonporous, hydrophilic, water soluble chitosan layer was then coated on the surface of the first layer of the thin, nonporous, hydrophilic, water soluble chitosan layer on the surface of the relatively hydrophilic, very small pore, nanoporous, asymmetric PES support membrane by coating the first layer of the thin, nonporous, hydrophilic, water soluble chitosan layer with a solution of chitosan dissolved in a dilute, aqueous acetic acid solution and then dried at 50-80° C. The thin, nonporous, hydrophilic, water soluble, dual chitosan layer on the support membrane was then directly converted to thin, nonporous, hydrophilic, water insoluble chitosan dual layer and impregnated with $AgNO_3$ by soaking the membrane coating layer in a $AgNO_3$ aqueous solution (3M in $H_2O$) for 2-3 h. The extra $AgNO_3$ aqueous solution was then removed from the membrane surface and the membrane was tested with a humidified (relative humidity 60-100%) propylene/propane ($C_3=/C_3$) gas mixture (70% $C_3=$/30% $C_3$) at 791 kPa (100 psig) and 50° C. The performance of the facilitated transport membrane (abbreviated as FTM-$AgNO_3$-Dual) is shown in TABLE 1.

Comparative Example 1

Preparation of Facilitated Transport Flat Sheet Membrane Using NaOH Solution Conversion Method (FTM-NaOH)

A facilitated transport membrane (FTM-NaOH) was prepared using a method similar to that used in EXAMPLE 2 except that the dried, relatively hydrophilic, very small pore, nanoporous PES support membrane containing the hydrophilic sodium alginate polymer within the very small nanopores on the membrane skin layer surface and the thin, nonporous, hydrophilic, water soluble chitosan polymer coating on the membrane surface was treated with a 0.8 M sodium hydroxide (NaOH) in a mixture of ethanol and water (5:1 volume ratio), washed with water several time to form the PES support membrane comprising sodium alginate within the very small nanopores on the membrane skin layer surface and the thin, nonporous, hydrophilic, water insoluble chitosan layer on the surface of the membrane. The NaOH treated relatively hydrophilic, very small pore, nanoporous PES support membrane containing the hydrophilic sodium alginate polymer within the very small nanopores on the membrane skin layer surface and the thin, nonporous, hydrophilic, water insoluble chitosan polymer coating on the membrane surface was then impregnated with $AgNO_3$ by soaking the membrane coating layer in a $AgNO_3$ aqueous solution (3M in $H_2O$) for 2-3 h. The extra $AgNO3$ aqueous solution was then removed from the membrane surface and the membrane was tested with a humidified (relative humidity 60-100%) propylene/propane ($C_3=/C_3$) gas mixture (70% $C_3=$/30% $C_3$) at 791 kPa (100 psig) and 50° C. The performance of the facilitated transport membrane (abbreviated as FTM-NaOH) is shown in TABLE 1.

Example 4

Propylene/Propane Separation Performance of FTM-$AgNO_3$-Single, FTM-$AgNO_3$-Dual, and FTM-NaOH Facilitated Transport Flat Sheet Membranes FTM-$AgNO_3$-single, FTM-$AgNO_3$-Dual, and FTM-NaOH facilitated transport flat sheet membranes prepared in EXAMPLE 2, EXAMPLE 3, and COMPARATIVE EXAMPLE 1, respectively, were tested at 791 kPa (100 psig) 70% propylene ($C_3=$)/30% propane ($C_3$) gas pressure at 50° C. with a relative humidity of 60-100% and a retentate flow of 200-700 cc/min. As shown in Table 1, both FTM-AgNO$_3$-single and FTM-AgNO$_3$-Dual facilitated transport membranes prepared using the new simplified, low cost method of direct converion without NaOH treatment disclosed in the present invention showed high $C_3=$/$C_3$ selectivity of >1,000 corresponding to a permeate stream with a propylene purity of >99.9%, comparable to that of the FTM-NaOH facilitated transport membrane prepared using a NaOH treatment method. In addition, the FTM-AgNO$_3$-single and FTM-AgNO$_3$-Dual facilitated transport membranes prepared using the new simplified, low cost method of direct converion without NaOH treatment disclosed in the present invention showed high performance stability and the membranes showed stable, maintained performance for a 66 h of continuous test.

TABLE 1

FTM-AgNO$_3$-Single, FTM-AgNO$_3$-Dual, and FTM-NaOH Facilitated Transport Flat Sheet Membranes for Propylene/Propane Separation

| Membrane | Chitosan Coating | Testing Time (h) | $P_{C3=}$/L (GPU) | $\alpha_{C3=/C3}$ |
|---|---|---|---|---|
| FTM-NaOH | Single | 20 | 36[a] | >1,000 |
| FTM-AgNO$_3$-Single | Single | 20 | 35[a] | >1,000 |
| FTM-AgNO$_3$-Dual | Dual | 2 | 44[a] | >1,000 |
|  |  | 14 | 45[a] | >1,000 |
|  |  | 16 | 82[b] | >1,000 |
|  |  | 66 | 45[a] | >1,000 |

[a]50° C.; feed: 791 kPa (100 psig) 70% $C_{3=}$/30% $C_3$, 60-100% relative humidity; permeate: 0 psig; retentate: 200 cc/min;
[b]50° C.; feed: 791 kPa (100 psig) 70% $C_{3=}$/30% $C_3$, 60-100% relative humidity; permeate: 0 psig; retentate: 700 cc/min;
1 GPU = 1 × 10$^{-6}$ cm$^3$(STP)/cm$^2$ · sec · cmHg Example 5

Preparation of Facilitated Transport Membrane Spiral Wound Element (FTM-AgNO$_3$-Single-Element) Using Direct AgNO$_3$ Aqueous Solution Conversion Method A facilitated transport membrane spiral wound element (FTM-AgNO3-Single-Element) with high propylene/propane selectivity was prepared from a relatively hydrophilic, very small pore, PES support membrane containing a hydrophilic sodium alginate polymer within the very small nanopores on the membrane skin layer surface and a thin, nonporous, hydrophilic, water soluble chitosan polymer coating on the membrane surface using a direct silver nitrate (AgNO3) aqueous solution conversion method. A relatively hydrophilic, very small pore, nanoporous, asymmetric PES support membrane was prepared via the phase-inversion process. A membrane casting dope comprising PES (BASF), N-methyl pyrrolidone, 1,3-dioxolane, glycerol and n-decane was cast on a nylon fabric then gelled by immersion in a 1° C. water bath for about 10 min, and then annealed in a hot water bath at 85° C. for about 5 min. A dilute aqueous solution of sodium alginate was applied via a nipping method onto the surface of the wet, relatively hydrophilic, very small pore, nanoporous, asymmetric PES support membrane. The wet membrane comprising sodium alginate within the very small nanopores on the membrane skin layer surface was dried at 60-80° C. and then coated with a solution of chitosan dissolved in a dilute, aqueous acetic acid solution and then dried at 40-70° C. to form a thin, nonporous, hydrophilic, water soluble chitosan layer on the surface of the PES support membrane. A chitosan-coated asymmetric PES support membrane spiral wound element was prepared from the thin, nonporous, hydrophilic, water soluble chitosan-coated asymmetric PES support membrane, feed spacers, permeate spacers, gas impermeable sheets marketed as Mylar® sheets, a permeate tube, and gas impermeable glue. The chitosan-coated asymmetric PES support membrane spiral wound element was then directly converted to a AgNO3-containing facilitated transport membrane spiral wound element by impregnating the chitosan polymer-coated spiral wound element with a 3M AgNO3 aqueous solution by exposing the thin, nonporous, hydrophilic, water soluble chitosan polymer layer comprising ammonium groups to the aqueous AgNO3 solution via a static solution soaking method or a pump-driven continuous solution circulation method for 2-3 h to convert the thin, nonporous, hydrophilic, water soluble chitosan polymer layer comprising ammonium groups to a thin, nonporous, hydrophilic, water insoluble chitosan polymer layer and simultaneously convert the chitosan-coated asymmetric PES support membrane spiral wound element to a facilitated transport spiral wound membrane element. The extra AgNO3 aqueous solution was then removed from the element and the element was tested with a humidified (relative humidity 60-100%) propylene/propane (C3=/C3) gas mixture (70% C3=/30% C3) at 791 kPa (100 psig) and 50° C. The performance of the facilitated transport membrane spiral wound element (abbreviated as FTM-AgNO3-Single-Element) is shown in TABLE 2.

Example 6

Preparation of Facilitated Transport Membrane Spiral Wound Element (FTM-AgNO$_3$-Dual-Element) Using Direct AgNO$_3$ Aqueous Solution Conversion Method A facilitated transport membrane spiral wound element (FTM-AgNO$_3$-Dual-Element) with high propylene/propane selectivity was prepared from a relatively hydrophilic, very small pore, nanoporous PES support membrane containing a hydrophilic sodium alginate polymer within the very small nanopores on the membrane skin layer surface and a thin, nonporous, hydrophilic, water soluble chitosan polymer coating on the membrane surface using a direct silver nitrate (AgNO$_3$) aqueous solution conversion method. A relatively hydrophilic, very small pore, nanoporous, asymmetric PES support membrane was prepared via the phase-inversion process. A membrane casting dope comprising PES (BASF), N-methyl pyrrolidone, 1,3-dioxolane, glycerol and n-decane was cast on a nylon fabric then gelled by immersion in a 1° C. water bath for about 10 min, and then annealed in a hot water bath at 85° C. for about 5 min. A dilute aqueous solution of sodium alginate was applied via a nipping method onto the surface of the wet, relatively hydrophilic, very small pore, nanoporous, asymmetric PES support membrane.

The wet membrane comprising sodium alginate within the very small nanopores on the membrane skin layer surface was dried at 60-80° C. and then coated with a solution of chitosan dissolved in a dilute, aqueous acetic acid solution and then dried at 40-70° C. to form a thin, nonporous, hydrophilic, water soluble chitosan layer on the surface of the membrane. A second layer of thin, nonporous, hydrophilic, water soluble chitosan layer was then coated on the surface of the first layer of the thin, nonporous, hydrophilic, water soluble chitosan layer on the surface of the relatively hydrophilic, very small pore, nanoporous, asymmetric PES support membrane by coating the first layer of the thin, nonporous, hydrophilic, water soluble chitosan layer with a solution of chitosan dissolved in a dilute, aqueous acetic acid solution and then dried at 50-80° C. A dual layer chitosan-coated asymmetric PES support membrane spiral wound element was prepared from the thin, nonporous, hydrophilic, dual layer water soluble chitosan-coated asymmetric PES support membrane, feed spacers, permeate spacers, gas impermeable sheets marketed as Mylar® sheets, a permeate tube, and gas impermeable glue. The dual layer chitosan-coated asymmetric PES support membrane spiral wound element was then directly converted to a AgNO3-containing facilitated transport membrane spiral wound element by impregnating the dual layer chitosan polymer-coated spiral wound element with a 3M AgNO3 aqueous solution by exposing the thin, nonporous, hydrophilic, water soluble chitosan polymer dual layer comprising ammonium groups to the aqueous AgNO3 solution via a static solution soaking method or a pump-driven continuous solution circulation method for 2-3 h to convert the thin, nonporous, hydrophilic, water soluble chitosan polymer dual layer comprising ammonium groups to a thin, nonporous, hydrophilic, water insoluble chitosan polymer dual layer and simultaneously convert the dual layer chitosan-coated asymmetric PES support membrane spiral wound element to a facilitated transport spiral wound membrane element. The extra AgNO3 aqueous solution was then removed from the element and the element was tested with a humidified (relative humidity 60-100%) propylene/propane (C3=/C3) gas mixture (70% C3=/30% C3) at 791 kPa (100 psig) and 50° C. The performance of the facilitated transport membrane spiral wound element (abbreviated as FTM-AgNO3-Dual-Element) is shown in TABLE 2.

Example 7

Propylene/Propane Separation Performance of FTM-AgNO$_3$-Single-Element and FTM-AgNO$_3$-Dual-Element FTM-AgNO$_3$-single-Element and FTM-AgNO$_3$-Dual-Element prepared in EXAMPLE 5 and EXAMPLE 6, respectively, were tested at 791 kPa (100 psig) 70% propylene (C$_3$=)/30% propane (C$_3$) feed gas pressure, 0-205 kPa (0-15 psig) permeate pressure at 50° C. with a relative humidity of 60-100% and a retentate flow of 70,000 cc/min. As shown in Table 2, both FTM-AgNO$_3$-single-Element and FTM-AgNO$_3$-Dual-Element facilitated transport membrane spiral wound elements prepared using the new simplified, low cost method of direct converion without NaOH treatment disclosed in the present invention showed high C$_3$=/C$_3$ selectivity of >300 and high C$_3$=permeance of >45 GPU. In addition, the FTM-AgNO$_3$-single-Element and FTM-AgNO$_3$-Dual-Element facilitated transport membrane spiral wound elements prepared using the new simplified, low cost method of direct converion without NaOH treatment disclosed in the present invention showed high performance stability and the elements showed stable, maintained performance for a 1200 h stability test.

TABLE 2

FTM-AgNO$_3$-Single-Element and FTM-AgNO$_3$-Dual-Element Facilitated Transport Membrane Spiral Wound Elements for Propylene/Propane Separation

| Membrane Element | Chitosan Coating | Testing Time (h) | $P_{C3=}/L$ (GPU) | $\alpha_{C3=/C3}$ |
|---|---|---|---|---|
| FTM-AgNO$_3$-Single-Element | Single | 23 | 87[a] | 402 |
|  |  | 1200 | 122[b] | 330 |
| FTM-AgNO$_3$-Dual-Element | Dual | 115 | 52[a] | 550 |
|  |  | 400 | 80[b] | 376 |

[a] 50° C.; feed: 791 kPa (100 psig) 70% C$_3$=/30% C$_3$, 60-100% relative humidity; permeate: 0 psig; retentate: 70,000 cc/min;
[b] 50° C.; feed: 929 kPa (100 psig) 70% C$_3$=/30% C$_3$, 60-100% relative humidity; permeate: 15 psig; retentate: 70,000 cc/min;
1 GPU = 1 × 10$^{-6}$ cm$^3$(STP)/cm$^2$ · sec · cmHg While the following is described in conjunction with specific embodiments, it will be understood that this description is intended to illustrate and not limit the scope of the preceding description and the appended claims.

A first embodiment of the invention is a method of making a facilitated transport membrane comprising coating a first layer of water soluble chitosan polymer comprising ammonium groups onto a skin layer surface of a support membrane; immersing the water soluble chitosan polymer layer comprising ammonium groups on the support membrane in an aqueous solution of a metal salt directly without first treating the water soluble chitosan polymer layer with a sodium hydroxide solution during the process to form the facilitated transport membrane; and then removing any extra aqueous metal salt solution from the resulting facilitated transport membrane. An embodiment of the invention is one, any or all of prior embodiments in this paragraph up through the first embodiment in this paragraph wherein the water soluble chitosan polymer layer is formed from an aqueous chitosan solution comprising 0.5 to 10 wt % chitosan and 1-2 wt % acetic acid. An embodiment of the invention is one, any or all of prior embodiments in this paragraph up through the first embodiment in this paragraph wherein the water soluble chitosan polymer layer is coated onto the skin layer of the support membrane by a dip-coating or a meniscus coating method. An embodiment of the invention is one, any or all of prior embodiments in this paragraph up through the first embodiment in this paragraph wherein the support membrane comprises a nanoporous support membrane and hydrophilic polymers inside the nanopores on the skin layer surface of the support membrane. An embodiment of the invention is one, any or all of prior embodiments in this paragraph up through the first embodiment in this paragraph wherein the aqueous solution of the metal salt comprises silver nitrate in a concentration of about 0.2M to 10M. An embodiment of the invention is one, any or all of prior embodiments in this paragraph up through the first embodiment in this paragraph wherein between the step a) and the step b) a second layer of water soluble chitosan polymer is applied on top of the first layer of water soluble chitosan polymer. An embodiment of the invention is one, any or all of prior embodiments in this paragraph up through the first embodiment in this paragraph wherein the second layer of water soluble chitosan polymer is formed from an aqueous chitosan solution comprising 0.5 to 10 wt % chitosan and 1-2 wt % acetic acid and wherein the aqueous chitosan solution for the second layer of water soluble chitosan polymer is at the same concentration as that for the first layer of water soluble chitosan polymer or at a lower concentration. An embodiment of the invention is one, any or all of prior embodiments in this paragraph up through the first embodiment in this paragraph wherein the facilitated transport membrane is in a form of a flat sheet or a hollow fiber. An embodiment of the invention is one, any or all of prior embodiments in this paragraph up through the first embodiment in this paragraph wherein the aqueous metal salt solution is applied by a static solution soaking method, a pump-driven continuous solution circulation method, or a combination thereof for a period of about 5 minutes to 24 hours. An embodiment of the invention is one, any or all of prior embodiments in this paragraph up through the first embodiment in this paragraph wherein the membrane is used to treat a gaseous feed stream comprising from 99 to 1 mole % of one or more C2-C8 olefins and from 1 to 99 mole % of one or more C1-C8 paraffins. An embodiment of the invention is one, any or all of prior embodiments in this paragraph up through the first embodiment in this paragraph wherein the support membrane comprises a polymer selected from the group consisting of polyethersulfone (PES), a blend of PES and polyimide, cellulose acetate, cellulose triacetate, and a blend of cellulose acetate and cellulose triacetate.

A second embodiment of the invention is a method of making a facilitated transport spiral wound membrane element comprising a) winding a water soluble chitosan polymer-coated spiral wound support membrane element using a water soluble chitosan-coated flat sheet support membrane, feed spacers, permeate spacers, gas impermeable sheets marketed as Mylar® sheets, a permeate tube, and gas impermeable glue; b) impregnating the water soluble chitosan polymer-coated spiral wound support membrane element with an aqueous metal salt solution by exposing the water soluble chitosan polymer coating layer to the aqueous metal salt solution directly without first treating the water soluble chitosan polymer coating layer with a sodium hydroxide solution; and c) then removing the extra aqueous metal salt solution from the spiral wound element to produce the facilitated transport spiral wound membrane element. An embodiment of the invention is one, any or all of prior embodiments in this paragraph up through the second embodiment in this paragraph wherein the metal salt is silver nitrate. An embodiment of the invention is one, any or all of prior embodiments in this paragraph up through the second embodiment in this paragraph wherein the aqueous metal salt solution is applied by a static solution soaking method, a pump-driven continuous solution circulation method, or a combination of the two methods for a period of time in a range from 5 min to 24 hours. An embodiment of the invention is one, any or all of prior embodiments in this paragraph up through the second embodiment in this paragraph wherein when a humidified feed stream comprising a mixture of olefins and paraffins is contacted with the facilitated transport spiral wound membrane elements made by the process, not less than 80 mole % of the olefins in the feed stream pass through the facilitated transport spiral wound membrane elements a permeate stream comprises not less than 90 mole % of olefin and not more than 10 mole % of paraffin.

A third embodiment of the invention is a process of making a facilitated transport hollow fiber membrane module comprising a) making a water soluble chitosan polymer-coated hollow fiber support membrane module using a water soluble chitosan-coated hollow fiber support membrane and gas impermeable glue; b) impregnating the water soluble chitosan polymer-coated hollow fiber support membrane module with an aqueous metal salt solution by exposing the water soluble chitosan polymer coating layer to the aqueous metal salt solution directly without first treating the water soluble chitosan polymer coating layer with a sodium hydroxide solution; and c) then removing the extra aqueous metal salt solution from the hollow fiber membrane module to produce the facilitated transport hollow fiber membrane module. An embodiment of the invention is one, any or all of prior embodiments in this paragraph up through the third embodiment in this paragraph wherein the metal salt is silver nitrate. An embodiment of the invention is one, any or all of prior embodiments in this paragraph up through the third embodiment in this paragraph wherein the aqueous metal salt solution is applied by a static solution soaking method, a pump-driven continuous solution circulation method, or a combination of the two methods for a period of time in a range from 5 min to 24 hours. An embodiment of the invention is one, any or all of prior embodiments in this paragraph up through the third embodiment in this paragraph wherein when a humidified feed stream comprising a mixture of olefins and paraffins is contacted with the facilitated transport hollow fiber membrane modules made by the process, not less than 80 mole % of the olefins in the feed stream pass through the facilitated transport hollow fiber membrane modules a permeate stream comprises not less than 90 mole % of olefin and not more than 10 mole % of paraffin. An embodiment of the invention is one, any or all of prior embodiments in this paragraph up through the third embodiment in this paragraph, further comprising at least one of sensing at least one parameter of the process and generating a signal from the sensing; sensing at least one parameter of the process and generating data from the sensing.

The invention claimed is:

1. A method of making a facilitated transport membrane comprising
   a) coating a first layer of water soluble chitosan polymer comprising ammonium groups onto a skin layer surface of a support membrane;
   b) immersing the water soluble chitosan polymer layer comprising ammonium groups on said support membrane in an aqueous solution of a metal salt directly without first treating the water soluble chitosan polymer layer with a sodium hydroxide solution during said process to form the facilitated transport membrane; and
   c) then removing any extra aqueous metal salt solution from the resulting facilitated transport membrane.

2. The method of claim 1 wherein said water soluble chitosan polymer layer is formed from an aqueous chitosan solution comprising 0.5 to 10 wt % chitosan and 1-2 wt % acetic acid.

3. The method of claim 1 wherein said water soluble chitosan polymer layer is coated onto said skin layer of said support membrane by a dip-coating or a meniscus coating method.

4. The method of claim 1 wherein said support membrane comprises a nanoporous support membrane and hydrophilic polymers inside the nanopores on the skin layer surface of said support membrane.

5. The method of claim 1 wherein said aqueous solution of said metal salt comprises silver nitrate in a concentration of about 0.2M to 10M.

6. The method of claim 1 wherein between said step a) and said step b) a second layer of water soluble chitosan polymer is applied on top of said first layer of water soluble chitosan polymer.

7. The method of claim 6 wherein said second layer of water soluble chitosan polymer is formed from an aqueous chitosan solution comprising 0.5 to 10 wt % chitosan and 1-2 wt % acetic acid and wherein said aqueous chitosan solution for said second layer of water soluble chitosan polymer is at the same concentration as that for said first layer of water soluble chitosan polymer or at a lower concentration.

8. The method of claim 1 wherein said facilitated transport membrane is in a form of a flat sheet or a hollow fiber.

9. The method of claim 1 wherein said aqueous metal salt solution is applied by a static solution soaking method, a pump-driven continuous solution circulation method, or a combination thereof for a period of about 5 minutes to 24 hours.

10. The method of claim 1 wherein said membrane is used to treat a gaseous feed stream comprising from 99 to 1 mole % of one or more C2-C8 olefins and from 1 to 99 mole % of one or more C1-C8 paraffins.

11. The method of claim 1 wherein said support membrane comprises a polymer selected from the group consisting of polyethersulfone (PES), a blend of PES and polyimide, cellulose acetate, cellulose triacetate, and a blend of cellulose acetate and cellulose triacetate.

12. A method of making a facilitated transport spiral wound membrane element comprising
   a) winding a water soluble chitosan polymer-coated spiral wound support membrane element using a water soluble chitosan-coated flat sheet support membrane, feed spacers, permeate spacers, gas impermeable sheets marketed as Mylar® sheets, a permeate tube, and gas impermeable glue;
   b) impregnating said water soluble chitosan polymer-coated spiral wound support membrane element with an aqueous metal salt solution by exposing the water soluble chitosan polymer coating layer to said aqueous metal salt solution directly without first treating the water soluble chitosan polymer coating layer with a sodium hydroxide solution; and
   c) then removing the extra aqueous metal salt solution from said spiral wound element to produce said facilitated transport spiral wound membrane element.

13. The method of claim 12 wherein said metal salt is silver nitrate.

14. The method of claim 12 wherein said aqueous metal salt solution is applied by a static solution soaking method, a pump-driven continuous solution circulation method, or a combination of the two methods for a period of time in a range from 5 min to 24 hours.

15. The method of claim 12 wherein when a humidified feed stream comprising a mixture of olefins and paraffins is contacted with said facilitated transport spiral wound membrane elements made by said process, not less than 80 mole % of the olefins in said feed stream pass through said facilitated transport spiral wound membrane elements a permeate stream comprises not less than 90 mole % of olefin and not more than 10 mole % of paraffin.

16. A process of making a facilitated transport hollow fiber membrane module comprising
   a) making a water soluble chitosan polymer-coated hollow fiber support membrane module using a water soluble chitosan-coated hollow fiber support membrane and gas impermeable glue;
   b) impregnating said water soluble chitosan polymer-coated hollow fiber support membrane module with an aqueous metal salt solution by exposing the water soluble chitosan polymer coating layer to said aqueous metal salt solution directly without first treating the water soluble chitosan polymer coating layer with a sodium hydroxide solution; and
   c) then removing the extra aqueous metal salt solution from said hollow fiber membrane module to produce said facilitated transport hollow fiber membrane module.

17. The process of claim 16 wherein said metal salt is silver nitrate.

18. The process of claim 16 wherein said aqueous metal salt solution is applied by a static solution soaking method, a pump-driven continuous solution circulation method, or a combination of the two methods for a period of time in a range from 5 min to 24 hours.

19. The process of claim 16 wherein when a humidified feed stream comprising a mixture of olefins and paraffins is contacted with said facilitated transport hollow fiber membrane modules made by said process, not less than 80 mole % of the olefins in said feed stream pass through said facilitated transport hollow fiber membrane modules a permeate stream comprises not less than 90 mole % of olefin and not more than 10 mole % of paraffin.

20. The method of claim 1, further comprising at least one of:
   sensing at least one parameter of the process and generating a signal from the sensing;
   sensing at least one parameter of the process and generating data from the sensing;
   generating and transmitting a signal;
   generating and transmitting data.

* * * * *